(12) United States Patent
Hooper et al.

(10) Patent No.: US 8,241,581 B2
(45) Date of Patent: Aug. 14, 2012

(54) APPARATUS, METHOD AND SYSTEM FOR DELIVERING OZONE

(75) Inventors: David M. Hooper, Austin, TX (US); Thomas Allen Foster, Boulder, CO (US)

(73) Assignee: Minimus Spine, Inc., Austin, TX (US)

( * ) Notice: Subject to any disclaimer, the term of this patent is extended or adjusted under 35 U.S.C. 154(b) by 1144 days.

(21) Appl. No.: 11/527,414

(22) Filed: Sep. 27, 2006

(65) Prior Publication Data

US 2008/0075639 A1 Mar. 27, 2008

(51) Int. Cl.
*C01B 13/11* (2006.01)
(52) U.S. Cl. ............... 422/186.07; 422/186; 422/186.08
(58) Field of Classification Search ............. 422/186.07, 422/186.08, 186
See application file for complete search history.

(56) References Cited

U.S. PATENT DOCUMENTS

| | | | |
|---|---|---|---|
| 4,725,412 A | 2/1988 | Ito | |
| 4,868,397 A * | 9/1989 | Tittel | 250/455.11 |
| 5,052,382 A | 10/1991 | Wainwright | |
| 5,413,769 A * | 5/1995 | Okazaki et al. | 422/186.07 |
| 5,540,898 A * | 7/1996 | Davidson | 422/186.15 |
| 6,007,785 A * | 12/1999 | Liou | 422/186.07 |
| 6,073,627 A * | 6/2000 | Sunnen | 128/202.25 |
| 6,110,431 A | 8/2000 | Dunder | |
| 6,270,733 B1 | 8/2001 | Rodden | |
| 6,331,279 B1 | 12/2001 | Martin | |
| 6,468,400 B2 * | 10/2002 | Smith | 204/176 |
| 6,601,602 B2 | 8/2003 | Adler et al. | |
| 6,679,419 B1 | 1/2004 | Sarracino | |
| 2003/0165411 A1 | 9/2003 | Engelhard | |
| 2005/0074501 A1 | 4/2005 | Murphy et al. | |
| 2007/0025890 A1 | 2/2007 | Joshi et al. | |

FOREIGN PATENT DOCUMENTS

DE 447 936 7/1927

* cited by examiner

*Primary Examiner* — Keith Hendricks
*Assistant Examiner* — Jason M Berman
(74) *Attorney, Agent, or Firm* — Maier & Maier, PLLC

(57) ABSTRACT

Apparatus, method and system for delivering sterile unit dose of ozone. System includes sterile vial containing oxygen and corona discharge assembly. Sterile vial is engaged to ozone conversion unit having high voltage transformer, ozone measurement mechanism, data input mechanism, and displayed read-out. When power is supplied to sterile vial containing corona discharge assembly, oxygen is converted to specified concentration of ozone. Sterile vial is disengaged from ozone conversion unit, drawing port is attached, and needle or similar extraction tool is used to withdrawal ozone for treatment.

1 Claim, 8 Drawing Sheets

APPARATUS, METHOD AND SYSTEM FOR DELIVERING OZONE

FIELD OF THE INVENTION

The present invention generally relates to ozone delivery systems. More generally, the invention relates to those used to facilitate delivery of ozone for therapeutic purposes.

BACKGROUND

Ozone is an unstable gas with a half life of less than one hour at room temperature. The methods used to convert oxygen to ozone involve high voltage corona discharge or ultraviolet light. Ozone generators have been available for decades for industrial uses. Indeed, ozone is a powerful oxidizer and has been used for deodorizing air, and purifying water. It is a known bactericide and viricide and recently has been used to sterilize medical instruments; although, the cycle times are so long as to be impractical for many uses.

Ozone generators have been used for therapeutic applications for several years. Such applications include but are not limited to autohemotherapy, rectal insufflations, intradiscal injection and full body exposure. Ozone has also been used to treat diffuse bulging or contained herniation of the spinal disc.

Spinal discs are composed of a fibrous outer ring made of Type I collagen and a softer more flexible nucleus made of Type II collagen, proteoglycans and water. Patients with disc bulging or herniation suffer from pain caused by disc compression of the neurological elements, including the spinal cord, cauda equina and nerve roots. Intradiscal ozone treatment involves direct injection of a gaseous mixture of oxygen and ozone into the nucleus of the disc. Ozone releases water from the proteoglycans, reducing disc size and relieving compression of neurological elements. Some investigators believe that ozone stimulates anti-inflammatory mediators and initiates a healing response.

The mechanism of action and reported success rates of ozone treatment are similar to that of the enzyme chymopapain. Chymopapain was first FDA-approved in 1983 and was widely used with a success rate of 65-85%. A small number of serious complications, including death and paralysis, caused the product to lose favor in the market and the product was eventually discontinued in the United States.

Ozone and chymopapain are two means of performing a chemical discectomy through a needle puncture. This minimally invasive approach may be preferred to surgical discectomy, which requires general anesthesia and direct access to the spinal disc.

Therapeutic ozone must be delivered immediately after being produced. Existing medical ozone generators pass medical oxygen through an electric field or ultraviolet light. This process converts an amount of oxygen into ozone. A syringe is interfaced with the machine whereby ozone is withdrawn for subsequent use in chemical discectomy.

The preferred concentration of ozone for this application is less than 6%. The concentration of ozone is important for medical uses. If the concentration is too low the treatment will not be effective; if the concentration is too high detrimental effects may follow. As such, medical ozone generators must include a means for measuring the concentration of ozone. The elements necessary to create and measure ozone are sensitive and require maintenance to ensure precise and accurate operation.

Present ozone generators have basic means for controlling the concentration and delivery of ozone gas. Oxygen is generally passed through a machine containing permanent electrodes; the gas chambers of present generators are often permanent as well. Some generators include components that neutralize excess ozone. Others generators continuously vent ozone, while still others are self-contained within a syringe, offering little means for measuring or controlling the concentration of ozone gas. Present ozone generators often include components for gas containment or pass oxygen through reaction chambers that are permanent and reusable, lending to sterility issues. Medical professionals often inject the gas through a bacterial filter to address such sterility issues.

Present generators are capable of offering a minimally invasive medical procedure to patients currently in need of surgical discectomy. Present generators lack an ozone delivery system that can efficiently provide sterile unit doses of ozone. Further, current systems lack the ability to ensure sterility and purity of the ozone dose, have high maintenance costs, fail to address problems associated with degradation of corona discharge mechanisms, and have inefficiencies associated with excessive production of ozone that must be neutralized through a catalytic converter.

SUMMARY

In accordance with at least one exemplary embodiment of the invention, a system for the production of therapeutic ozone includes a disposable unit including medical oxygen, electrodes and a power supply and measurement system.

A further exemplary embodiment may provide a sterile, disposable canister, vial or the like containing a unit dose of oxygen gas that can be interfaced with a reusable power source to convert that unit into ozone gas. This can act to maintain the gaseous mixture in a sterile environment to decrease the risk of contamination.

In yet another exemplary embodiment, electrodes of the corona discharge mechanism may be incorporated within the disposable vial to decrease maintenance costs and increase performance of the ozone delivery system. Additionally, a unit dose of ozone may be provided to reduce the risk of environmental exposure and reduce the need for an ozone disposal element. Also, a unit dose of ozone that incorporates a mechanism that reduces ease of reuse of the disposable vial may reduce potentially harmful misuse of discharged canisters.

BRIEF DESCRIPTION OF THE DRAWINGS

Further advantages of embodiments of the present invention will be apparent from the following detailed description of the preferred embodiments thereof, which description should be considered in conjunction with the accompanying drawings in which:

FIG. 1b shows an exemplary cross-sectional view along line B of the sterile vial of FIG. 1a.

FIG. 3b shows an exemplary inverted perspective view of the actuator cap of FIG. 3a.

FIG. 3c shows an exemplary top view of the actuator cap of FIG. 3a.

FIG. 6d shows an exemplary side view of the sterile vial and actuator cap of FIG. 6a.

FIG. 7a shows an exemplary detailed perspective view of the sterile vial of FIG. 1a.

FIG. 7b shows an exemplary detailed perspective and inverted view of the sterile vial FIG. 1a.

FIG. 8 shows an exemplary detailed perspective view of the actuator cap of FIG. 3a.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Referring generally to FIGS. 1a-6d, a system for generating and delivering a sterile and substantially pure dose of ozone and oxygen is shown. An exemplary system may include a sterile vial 100, an ozone conversion unit 200, and an attachable actuator cap 300. The sterile vial may be sealed, containing therein a corona discharge assembly 104 and oxygen. Ozone conversion unit 200 may include an ozone UV measurement assembly 216, a data input mechanism such as a dial 214 to allow the user to select a desired ozone concentration, and a data display 218 to display input and output data such as desired concentrations and measurements. After sterile vial 100 is engaged to the ozone conversion unit 200, an ozone concentration may be selected and power applied to effect corona discharge and the resultant conversion of oxygen to the selected concentration of ozone. Sterile vial 100 may then be disengaged and actuator cap 300 joined thereto, thus allowing for oxygen and ozone mixture withdrawal. This may be accomplished by attaching to actuator cap 300 a membrane that may be semi-permeable, or in the alternative, a step-wise withdrawal mechanism comprising two Leuer lock fittings capable of actuating sterile vial 100 and accommodating transfer of a gaseous mixture to an attachable syringe. The ozone delivery system may be employed in any of a variety of situations including, for example, the therapeutic treatment of humans or animals by way of injection.

Figure 1A:
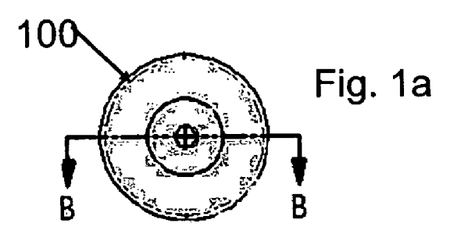
FIG. 1a shows an exemplary top view of a sterile vial.
Figure 1B:
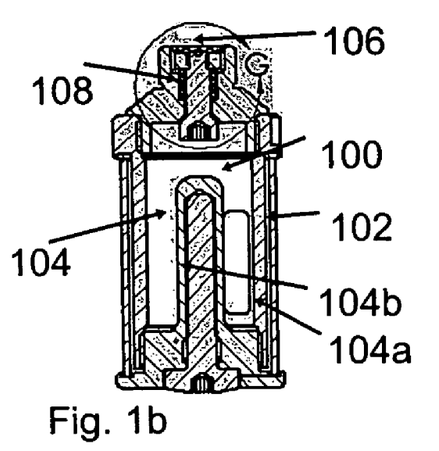
Figure 1C:
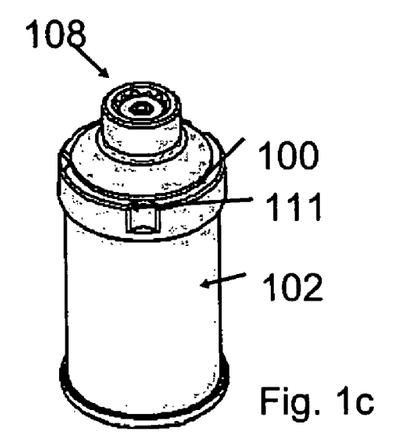
FIG. 1c shows an exemplary perspective view of a sterile vial.
Figure 1D:
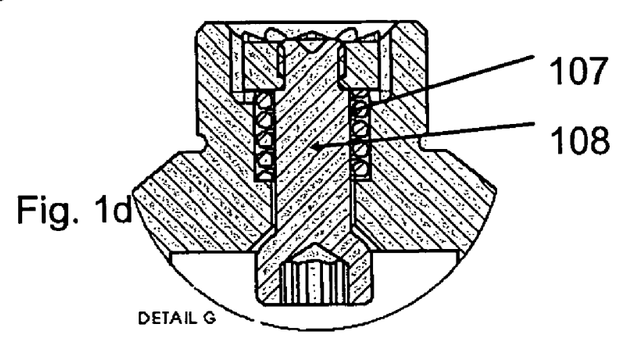
FIG. 1d shows an exemplary enlarged cross-sectional view of the area circumscribed by line G of the sterile vial of FIG. 1b.

FIGS. 1a-1d show an exemplary embodiment of sterile vial 100. Sterile vial 100 may have a variety of components, such as a casing 102, corona discharge assembly 104, electrical contact points 106, a port and one-way valve 108 and a key structure 111. Sterile vial 100 may be substantially sealed and filled with oxygen under pressure. Construction of the sterile vial may be accomplished by evacuating a vial under a vacuum; an exemplary pressure for which may be about 25 inches of Hg. The vial may be filled with, for example, about 10-30 ml of medical grade oxygen and then sealed. An exemplary embodiment may include port and one-way valve 108 for sealing, which may be constructed to reduce efflux of gas from sterile vial 100 and allow influx of gas when actuated. As depicted in FIG. 1d, this may be accomplished by a spring-valve mechanism 107. One exemplary embodiment which may be included within port and one-way valve 108 is a series of valves to first allow a vacuum to be drawn and then to allow influx of oxygen. An exemplary series of valves may include a single valve with a first setting and a second setting at the center to form a Y-shaped configuration. The first setting would connect sterile vial 100 to a vacuum. After a vacuum is established within sterile vial 100, the valve may be adjusted to the second setting thereby providing a path for the oxygen to flow into sterile vial 100. Sterile vial 100 and packaging, if any, may then be sterilized. Gamma sterilization may be preferred over autoclaving, which involves temperatures that may increase pressure and compromise the structural integrity of sterile vial 100.

Casing 102 may be constructed out of a material that allows for UV transmission, such as, but not limited to, acrylic, quartz or any other such material known to one having ordinary skill in the art to have substantially similar absorption coefficients. This can allow passage of a UV beam through the gas so that the concentration of ozone can be measured.

As depicted in FIG. 1b, corona discharge assembly 104 may be arranged within casing 102 and may comprise an outer electrode 104a and an inner electrode 104b. They may be arranged to create an electric field, the strength of which can be changed using appropriate dielectrics and voltage settings. In one exemplary embodiment of the present invention, this can be accomplished by encasing outer electrode 104a in a dielectric material and incorporating an inner cylinder 112 of dielectric materials encasing inner electrode 104b. Such a configuration can have the advantage of shielding the electrodes from long-term oxygen exposure. In another exemplary embodiment, the outer electrode may be situated outside sterile vial 100, and may further be situated in ozone conversion unit 200. This embodiment may create unusable ozone outside of sterile vial 100 that could result in atmospheric contamination. In another exemplary embodiment, corona discharge assembly 104 may be arranged to accommodate axial passage of UV light; or an alternative embodiment, transverse passage of UV light. Corona discharge assembly 104 may be connected to electrical contact points 106. Electrical contact points 106 may be arranged to interface with the exterior of sterile vial 100.

Figure 2A:
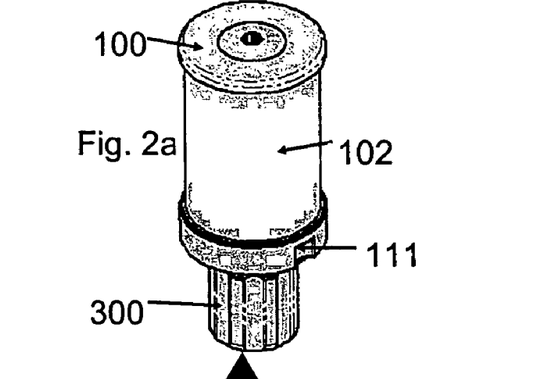
FIG. 2a shows an exemplary perspective view of a sterile vial and attached actuator cap.
Figure 2B:
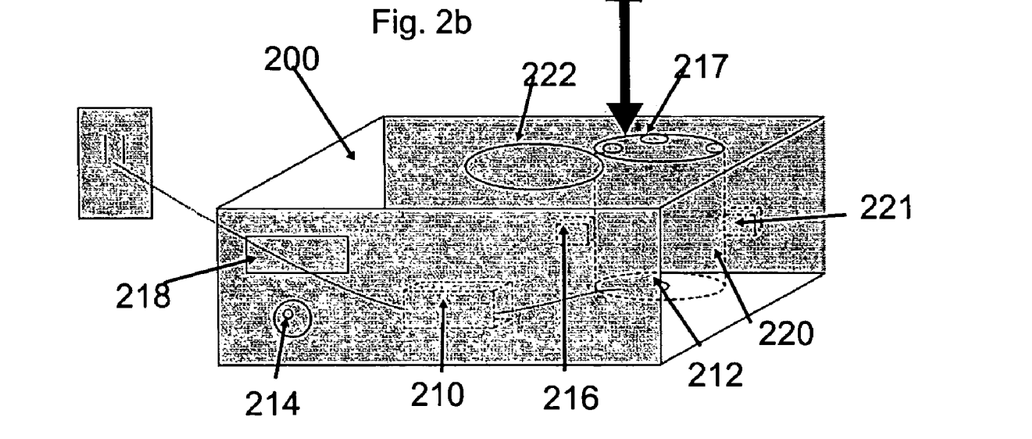
FIG. 2b shows and exemplary diagrammatical view of an ozone conversion unit.
Figure 3A:
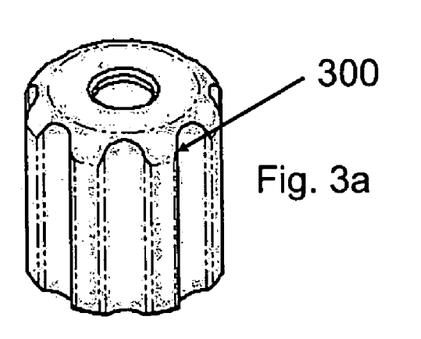
FIG. 3a shows an exemplary perspective view of an actuator cap.
Figure 3B:
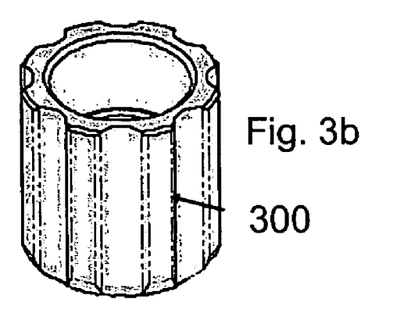
Figure 3C:
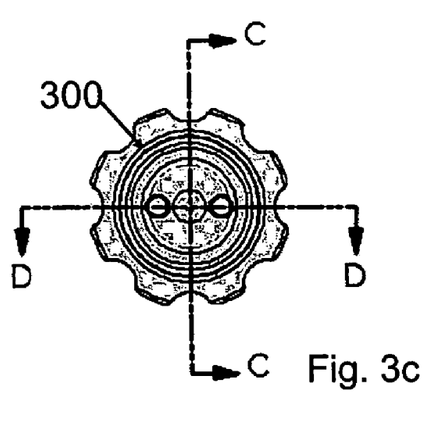
Figure 3D:
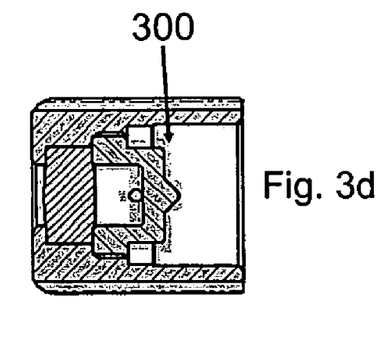
FIG. 3d shows an exemplary cross-sectional view along line D of the sterile vial of FIG. 3c.
Figure 3E:
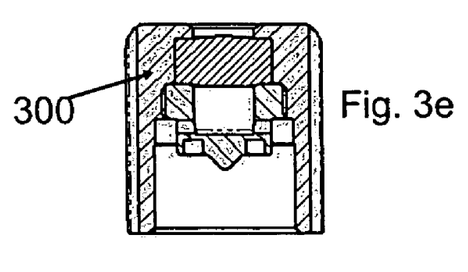
FIG. 3e shows an exemplary cross-sectional view along line C of the sterile vial of FIG. 3c.

FIGS. 2a-2b shows an exemplary diagram of ozone conversion unit 200 and sterile vial 100. Ozone conversion unit 200 may be used to convert an amount of oxygen contained in sterile vial 100 to ozone by facilitating power. Ozone conversion unit 200 may include a high voltage transformer 210. In an exemplary embodiment, high voltage transformer 210 may have a potential difference of about 5-25 kV. High voltage transformer 210 may be connected to a power source and electrical contact points 212. In another exemplary embodiment, electrical contact points 212 may be arranged to reversibly interface with electrical contacts 106 of sterile vial 100.

Ozone conversion unit 200 may further include a dial 214, a UV measurement assembly 216, and a data display 218. UV measurement assembly 216 may include components relating to measurement using UV absorption techniques, whereby a beam is passed through the ozone and oxygen mixture to be received by a detector. Such a beam may have a wavelength of within a range on the UV spectrum known to those skilled in the art to be absorbed by ozone such as ranges UV-A, UV-B, and UV-C; it may be preferable to use light emissions having wavelengths of about 253.7 nm, within the bounds of the UV-C range. In an exemplary embodiment, a mercury vapor lamp may be used to measure the concentration of ozone. An alternative exemplary embodiment may employ a UV light emitting diode or other instruments known to one having ordinary skill in UV absorption techniques. An exemplary detector may be a photodiode or other photo detecting instruments known to those having ordinary skill in the art. Dial 214 may be used to regulate or input a desired ozone concentration. An exemplary therapeutically effective concentration of ozone is 6% by volume. Sterile vial 100 may be constructed to be received by ozone conversion unit 200 in such a way that orients sterile vial 100 for successful UV measurement; this may be achieved by including a lock 217 on ozone conversion unit 200 capable of receiving key structure 111.

In an exemplary embodiment, electrical contact points 212 may be situated to interface with the interior of a receptacle 220 formed in the ozone conversion unit that is capable of receiving sterile vial 100. UV measurement assembly 216 may be arranged to orient a UV measurement beam axially through and along receptacle 220 to be received by a UV detector 221. In an alternative embodiment, UV measurement assembly 216 may be arranged to orient the UV measurement beam through receptacle 220 transversely. A further exemplary embodiment may include a door 222 to be closed upon an engaged sterile vial 100, thereby reducing ambient light from infiltrating receptacle 220 and interfering with UV detector 221.

Data display 218 may be used to display measurement data collected by UV measurement assembly 216, indicate power status, or convey other relevant information such as input data or to confirm engagement of sterile vial 100 and ozone conversion unit 200. Data display 218 may be used to display any information or data that may be useful to one having ordinary skill in the art. Ozone conversion unit 200 may be constructed to receive power, which can be made to pass through high voltage transformer 210, electrical contact points 212 and electrical contact points 106, thereby causing corona discharge assembly 104 to act upon the oxygen contained by sterile vial 100 and effect the selected concentration of ozone.

FIGS. 3a-3e depict an exemplary embodiment of an actuator cap 300. Actuator cap 300 may be constructed to act upon port and one-way valve 108 thereby permitting influx of oxygen. In a further embodiment, actuator cap 300 may be constructed to act upon port and one-way valve 108 to permit efflux of ozone following ozone conversion. Actuator cap 300 may be constructed to irremovably attach to port and one-way valve 108. Another embodiment of actuator cap 300 may include mechanisms known to one having ordinary skill in the art to prevent reattachment to port and one-way valve 108. In yet another exemplary embodiment, actuator cap 300 may be formed to permit attachment of an oxygen source. In an alternate exemplary embodiment, actuator cap 300 may be formed to permit withdrawl of ozone to allow subsequent injection into a patient. One exemplary embodiment may include mechanisms to signal attachment of actuator cap 300 to port and one-way valve 108 sufficient for gaseous mixture influx or efflux.

Figure 4A:
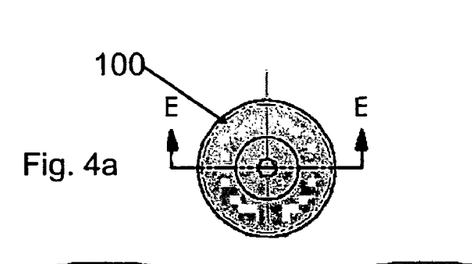
FIG. 4a shows an exemplary top view of a sterile vial.
Figure 4B:
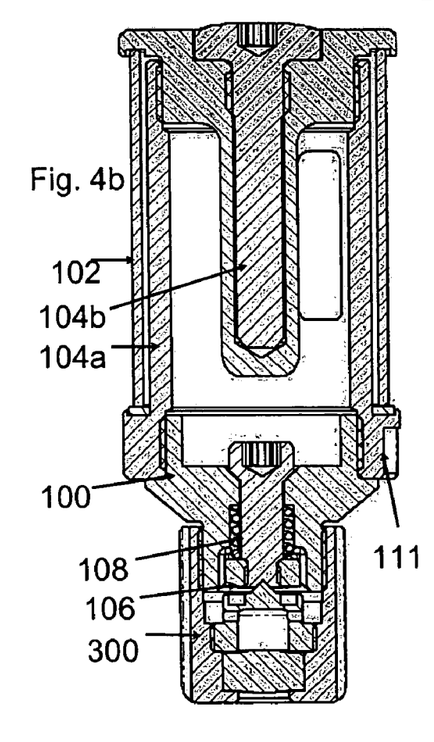
FIG. 4b shows and exemplary cross-sectional view along line E of the sterile vial of FIG. 4a having a valve in the closed position.
Figure 4C:
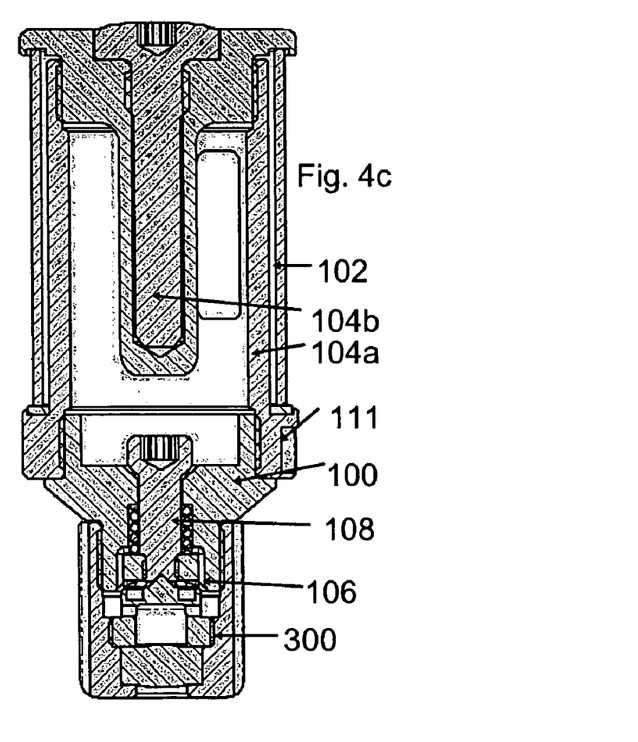
FIG. 4c shows an exemplary cross-sectional view along line E of the sterile vial of FIG. 4a having a valve in the open position.

FIGS. 4a-4c shows an exemplary embodiment of actuator cap 300 engaged with sterile vial 100. FIG. 4b shows actuator 300 attached to sterile vial 100 wherein actuator cap 300 is not acting upon port and one-way valve mechanism 108. FIG. 4c shows actuator cap 300 attached to sterile vial 100 wherein actuator cap 300 is acting upon sterile port and one-way valve mechanism 108.

Figure 5A:
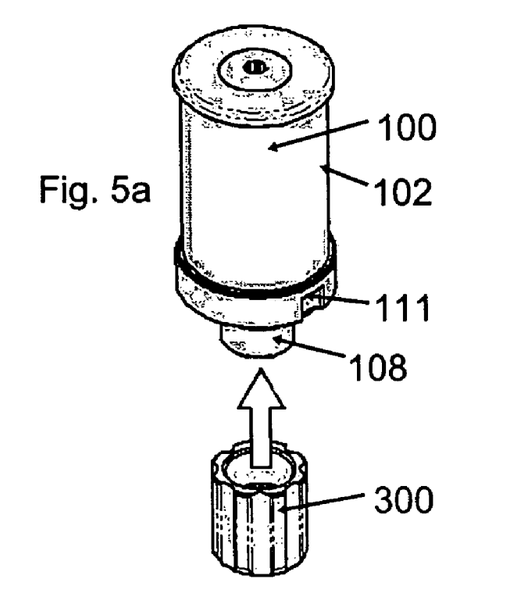
FIG. 5a shows an exemplary perspective view of a sterile vial and an actuator cap.
Figure 5B:
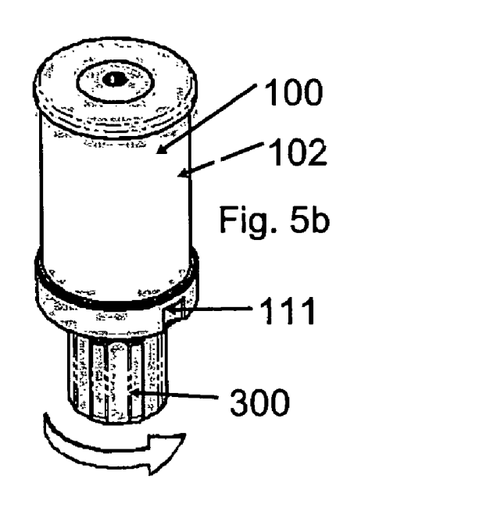
FIG. 5b shows an exemplary perspective view of sterile vial with an attached actuator cap.
Figure 5C:
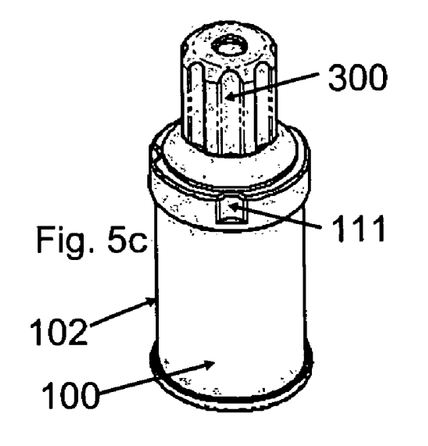
FIG. 5c shows an exemplary perspective and inverted view of the sterile vial and attached actuator cap of FIG. 5b.
Figure 5D:
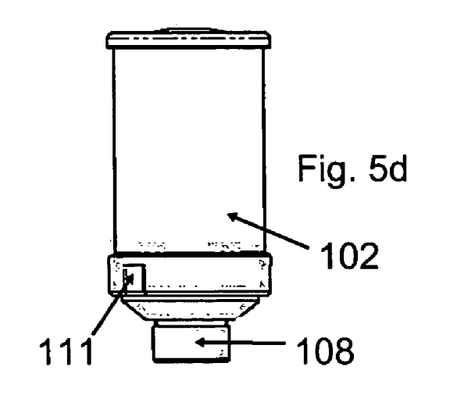
FIG. 5d shows an exemplary side view of the sterile vial of FIG. 5b.

FIGS. 5a-5d shows another exemplary embodiment of sterile vial 100 and actuator cap 300. Casing 102 may be formed of quartz or similar material known to one skilled in the art. Actuator cap 300 may be formed to engage with port and one-way valve 108, as shown in FIGS. 5a-5b.

Figure 6A:
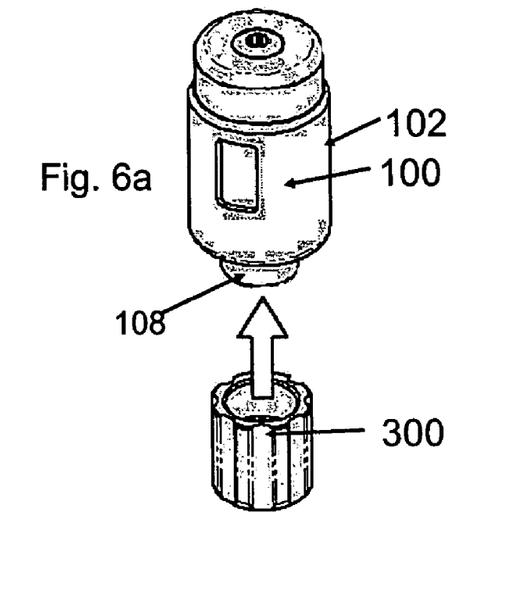
FIG. 6a shows an exemplary perspective view of a sterile vial and an actuator cap.
Figure 6B:
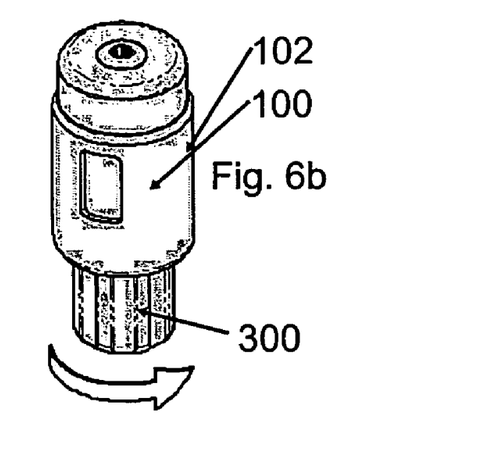
FIG. 6b shows an exemplary perspective view of a sterile vial with an attached actuator cap.
Figure 6C:
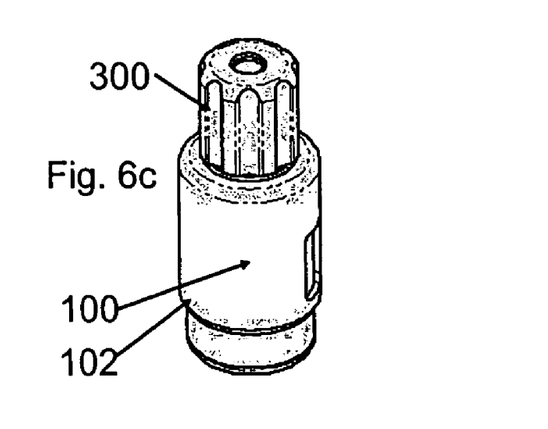
FIG. 6c shows an exemplary perspective and inverted view of the sterile vial and attached actuator cap of FIG. 6b.
Figure 6D:
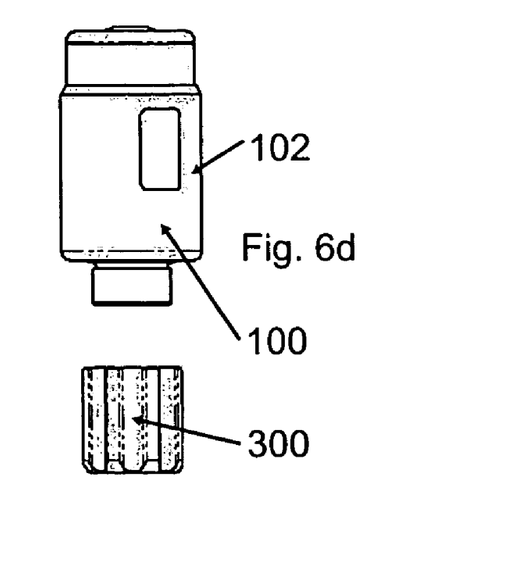

FIGS. 6a-6b show yet another exemplary embodiment of sterile vial 100 and actuator cap 300. Casing 102 may be formed to include an opaque sleeve 103 having a portion constructed of acrylic or similar material known to one skilled in the art whereby the interior of sterile vial 100 may be viewed.

Figure 7A:
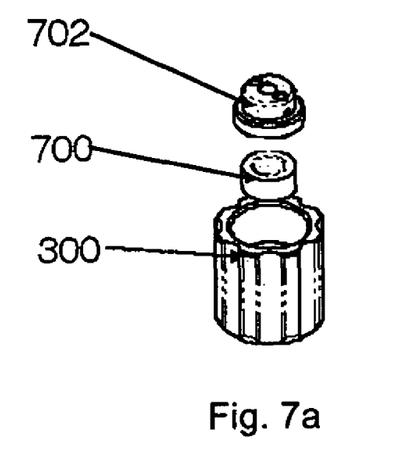
Figure 7B:
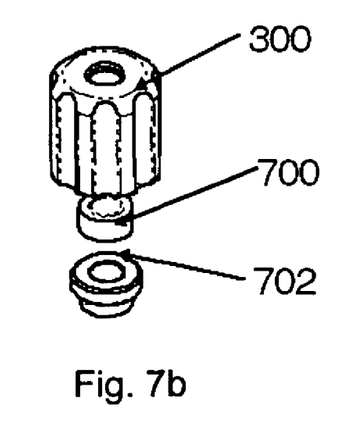

FIGS. 7a-7b show another exemplary embodiment of actuator cap 300. Actuator cap 300 may be arranged to include a needle cap 700 and a valve actuator 702. In one exemplary embodiment, needle cap 70 could include a clutch mechanism to reduce ease of removing actuator cap 300 from sterile vial 100 when actuator cap 300 is attached to sterile vial 100.

Figure 8:
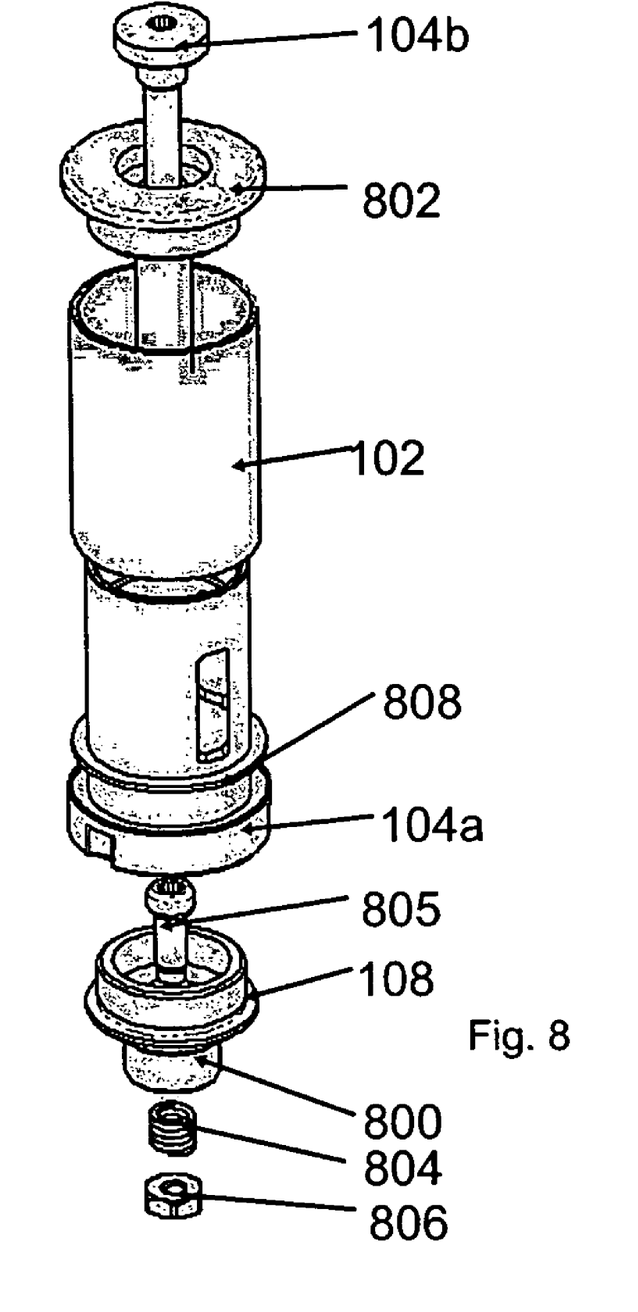

FIG. 8 shows yet another exemplary embodiment of sterile vial 100. Inner electrode 104b may be positioned through an electrode cap 802. The electrode cap may meet casing 102 at one end. Casing 102 may concentrically enclose a portion of an electrode seal 808 and an opposite end of casing 102 may meet a portion of electrode seal 808. Outer electrode 104a may be positioned concentrically within electrode seal 808. In one exemplary embodiment, port and one-way valve 108 may include a valve stem 805 may be positioned within outer electrode 104a. Valve stem 805 may be attached to one end of a valve cap 800. A spring 804 or similar compressible element known to one of ordinary skill in the art may be inserted in an opposite end of valve cap 800 and may be secured by a spring nut 806. In one exemplary embodiment, port and one-way valve 108 may be constructed to require a pressure of about 400 psi to bias valve stem 805 to the open position.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for delivering sterile unit doses of ozone comprising:
   substantially sterilizing and substantially sealing a unit dose vial containing at least one electrode;
   filling the substantially sterilized and substantially sealed unit dose vial containing at least one electrode with an oxygen mixture;
   attaching an actuator capable of modifying a fluid path of said substantially sterilized and substantially sealed vial;
   inserting said substantially sterilized and substantially sealed vial into a dock capable of providing power to said at least one electrode to produce a unit dose of ozone;
   withdrawing ozone from said substantially sterilized and substantially sealed vial using said actuator.

* * * * *